US011141669B2

(12) United States Patent
Candelore et al.

(10) Patent No.: US 11,141,669 B2
(45) Date of Patent: Oct. 12, 2021

(54) SPEECH SYNTHESIZING DOLLS FOR MIMICKING VOICES OF PARENTS AND GUARDIANS OF CHILDREN

(71) Applicant: Sony Corporation, Tokyo (JP)

(72) Inventors: Brant Candelore, Escondido, CA (US); Mahyar Nejat, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/432,683

(22) Filed: Jun. 5, 2019

(65) Prior Publication Data

US 2020/0384372 A1 Dec. 10, 2020

(51) Int. Cl.
*A63H 3/31* (2006.01)
*A63H 3/36* (2006.01)
*G10L 13/02* (2013.01)
*G10L 15/26* (2006.01)

(52) U.S. Cl.
CPC ............... *A63H 3/31* (2013.01); *A63H 3/36* (2013.01); *G10L 13/02* (2013.01); *G10L 15/26* (2013.01); *A63H 2200/00* (2013.01)

(58) Field of Classification Search
CPC . A63H 3/003; A63H 3/28; A63H 3/31; A63H 3/36; A63H 2200/00; G10L 13/02; G10L 15/26
USPC .................................................. 446/297, 302
See application file for complete search history.

(56) References Cited

U.S. PATENT DOCUMENTS 5,251,251 A 10/1993 Barber et al.
6,394,872 B1 * 5/2002 Watanabe ................ A63H 3/28
446/175
6,807,291 B1 * 10/2004 Tumey ..................... A63H 3/28
382/124
7,020,310 B2 * 3/2006 Tumey ..................... A63H 3/28
382/124
7,062,073 B1 * 6/2006 Tumey ..................... A63H 3/28
382/118
7,865,365 B2 1/2011 Anglin et al.
8,131,549 B2 3/2012 Teegan et al.
8,666,746 B2 * 3/2014 Bangalore ............. G10L 15/197
704/258
9,087,512 B2 * 7/2015 Chen ....................... G10L 13/02

(Continued)

FOREIGN PATENT DOCUMENTS

CN 102693729 B 9/2014

OTHER PUBLICATIONS

"Baidu AI Can Clone Your Voice in Seconds", Medium, Feb. 21, 2018.

(Continued)

*Primary Examiner* — Joseph B Baldori
(74) *Attorney, Agent, or Firm* — John L. Rogitz

(57) ABSTRACT

Speech synthesizing devices and methods are disclosed for using a doll or toy to mimic the voice of a parent or guardian of a child as reading a children's book. A speech synthesizer that employs an artificial neural network can be used to do so, with the artificial neural network being trained using audio recordings of the parent or guardian speaking as well as text corresponding to the words that are spoken by the parent or guardian in the audio recordings. The artificial neural network may then be used to produce various audio outputs in the voice of the parent or guardian as reading a children's book to the parent or guardian's child.

15 Claims, 6 Drawing Sheets

(56) References Cited

U.S. PATENT DOCUMENTS

| | | | |
|---|---|---|---|
| 10,176,798 | B2 | 1/2019 | Gueta et al. |
| 10,410,621 | B2* | 9/2019 | Li .................... G10L 15/142 |
| 10,510,358 | B1* | 12/2019 | Barra-Chicote ........ G10L 13/02 |
| 2002/0111808 | A1* | 8/2002 | Feinberg .................. A63H 3/28 704/270.1 |
| 2003/0123712 | A1 | 7/2003 | Dimitrova et al. |
| 2006/0074672 | A1 | 4/2006 | Allefs |
| 2006/0095265 | A1 | 5/2006 | Chu et al. |
| 2006/0285654 | A1 | 12/2006 | Nesvadba et al. |
| 2006/0287860 | A1 | 12/2006 | Agapi et al. |
| 2007/0218986 | A1 | 9/2007 | Luchene et al. |
| 2011/0064388 | A1 | 3/2011 | Brown et al. |
| 2011/0070805 | A1* | 3/2011 | Islava ..................... A63H 3/28 446/397 |
| 2012/0014553 | A1 | 1/2012 | Bonanno |
| 2013/0034835 | A1 | 2/2013 | Min |
| 2013/0282376 | A1 | 10/2013 | Nonaka |
| 2014/0038489 | A1* | 2/2014 | Sharma ................... A63H 3/28 446/175 |
| 2015/0199978 | A1 | 7/2015 | McCoy et al. |
| 2016/0021334 | A1 | 1/2016 | Rossano et al. |
| 2016/0104474 | A1 | 4/2016 | Bunn et al. |
| 2016/0365087 | A1 | 12/2016 | Freud |
| 2017/0309272 | A1 | 10/2017 | Vanreusel et al. |
| 2018/0272240 | A1* | 9/2018 | Soudek .................... A63H 3/28 |
| 2019/0005024 | A1 | 1/2019 | Somech et al. |
| 2019/0147838 | A1 | 5/2019 | Serletic et al. |
| 2019/0304480 | A1* | 10/2019 | Narayanan ................ G06F 3/16 |
| 2019/0362703 | A1* | 11/2019 | Ijima ........................ G06N 3/08 |
| 2020/0211565 | A1 | 7/2020 | Dubinsky et al. |
| 2020/0234689 | A1 | 7/2020 | Lai |
| 2020/0251089 | A1 | 8/2020 | Pinto |
| 2020/0265829 | A1 | 8/2020 | Liu et al. |

OTHER PUBLICATIONS

"Brainy Voices: Innovative Voice Creating Based on Deep Learning by Acapela Group Research Lab", Acapela Group, Jun. 29, 2017.

"Personalized Virtual Assistants for the Elderly: Acapela is Working on Adaptive Expressive Voices for the Empathic Research Project", Acapela Group, Sep. 4, 2018.

"Repertoire", Acapela Group, Date Unknown.

"Speech Impairment: Acapela DNN Technology Enhances the Voice Banking Process of My-Own-Voice", Acapela Group, Oct. 4, 2018.

Brant Candelore, Mahyar Nejat, "Speech Synthesizing Devices and Methods for Mimicking Voices of Children for Cartoons and Other Content", file history of related U.S. Appl. No. 16/432,660, filed Jun. 5, 2019.

Brant Candelore, Mahyar Nejat,"Speech Synthesizing Devices and Methods for Mimicking Voices of Public Figures", file history of related U.S. Appl. No. 16/411,930, filed May 14, 2019.

Brant Candelore, Mahyar Nejat, "Speech Synthesizing Devices and Methods for Mimicking Voices of Children for Cartoons and Other Content", related U.S. Appl. No. 16/432,660, Non-Final Office Action dated Nov. 3, 2020.

"Manipulate", The American Heritage Dictionary of the English Language, retrieved from https://www.ahdictionary.com/word/search.html?q=manipulate.

Brant Candelore, Mahyar Nejat, "Speech Synthesizing Devices and Methods for Mimicking Voices of Children for Cartoons and Other Content", related U.S. Appl. No. 16/432,660, Applicant's response to Non-Final Office Action filed Jan. 11, 2021.

Brant Candelore, Mahyar Nejat,"Speech Synthesizing Devices and Methods for Mimicking Voices of Public Figures", related U.S. Appl. No. 16/411,930, Non-Final Office Action dated Jan. 15, 2021.

Brant Candelore, Mahyar Nejat,"Speech Synthesizing Devices and Methods for Mimicking Voices of Public Figures", related U.S. Appl. No. 16/411,930, Applicant's response to Non-Final Office Action dated Feb. 12, 2021.

Brant Candelore, Mahyar Nejat, "Speech Synthesizing Devices and Methods for Mimicking Voices of Children for Cartoons and Other Content", related U.S. Appl. No. 16/432,660, Final Office Action dated Mar. 25, 2021.

Brant Candelore, Mahyar Nejat, "Speech Synthesizing Devices and Methods for Mimicking Voices of Children for Cartoons and Other Content", related U.S. Appl. No. 16/432,660, Applicant's response to Final Office Action filed Jun. 2, 2021.

* cited by examiner

SPEECH SYNTHESIZING DOLLS FOR MIMICKING VOICES OF PARENTS AND GUARDIANS OF CHILDREN

FIELD

The present application relates to technically inventive, non-routine text-to-speech solutions that are necessarily rooted in computer technology and that produce concrete technical improvements.

BACKGROUND

Currently, many consumer electronics device-based text-to-speech systems employ automated and robotic-sounding voices to provide audio output. Sometimes those voices use an accent or unfamiliar tone that makes it particularly difficult for a child to understand the information that the device is attempting to convey. There are currently no adequate solutions to the foregoing computer-related, technological problem.

SUMMARY

Present principles involve using speech synthesizing devices and methods to duplicate the voices of parents or guardians (including e.g., their accents, tones, etc.). A text-to-speech deep neural network (DNN) can be used to do so, where the DNN may be trained using audio recordings of a given parent or guardian speaking as well as text corresponding to the words that are spoken by the parent or guardian in the audio recordings. The DNN may then be used to produce various other audio outputs in the voice of the parent or guardian.

Accordingly, in one aspect a doll includes at least one processor, a speaker accessible to the at least one processor, an optional electronic display accessible to the at least one processor, and at least one computer memory that is not a transitory signal. The at least one computer memory includes instructions executable by the at least one processor to present first text of a children's book on the electronic display. The instructions are also executable to use a trained deep neural network (DNN) to audibly produce a representation of at least one parent or guardian of a child as speaking audio corresponding to the first text via the speaker. The trained DNN is trained using both audio of words spoken by the parent or guardian and second text corresponding to the words spoken by the parent or guardian, where the first text is different from the second text. The instructions are also executable to concurrently highlight respective portions of the first text as presented on the electronic display as corresponding respective portions of the representation are audibly produced.

In some examples, the DNN may be trained unsupervised.

Also, in some examples, the instructions may be executable to highlight the respective portions of the first text as presented on the electronic display by presenting the respective portions of the first text as the corresponding respective portions of the representation are audibly produced. Additionally, or alternatively, the instructions may be executable to highlight the respective portions of the first text as presented on the electronic display by underlining or circling the respective portions of the first text as the corresponding respective portions of the representation are audibly produced. Still further, in some examples the instructions may be executable to highlight the respective portions of the first text as presented on the electronic display by highlighting the respective portions of the first text in a particular color different from the color in which the surrounding portions of the text are presented as the corresponding respective portions of the representation are audibly produced.

If desired, in some implementations the doll may include a first hardware element with which a first parent or guardian of the child is associable such that upon association the first hardware element is manipulable to configure the doll to produce representations of the first parent or guardian as speaking audio. The doll may also include a second hardware element with which a second parent or guardian of the child is associable such that upon association the second hardware element is manipulable to configure the doll to produce representations of the second parent or guardian as speaking audio, with the second parent or guardian being different from the first parent or guardian. The first and second parents or guardians may be associable respectively with the first and second hardware elements during a configuration process facilitated by the at least one processor. In some examples, the first and second hardware elements may be embodied in a single hardware element that may be a switch disposed on the doll and that is accessible to the at least one processor. In other examples, the first and second hardware elements may be embodied in different respective hardware elements.

Still further, in some examples the doll may include a network interface accessible to the at least one processor and, during the configuration process, the first and second parents or guardians may be instructed to connect, via the network interface, the doll to one or more Internet-accessible profiles. The one or more Internet-accessible profiles may be associated with respective DNNs for the respective first and second parents or guardians.

Also in some example implementations, the doll may include a microphone accessible to the at least one processor and, during the configuration process, the first and second parents or guardians may be instructed to speak certain predefined phrases provided by the doll to train respective DNNs for the respective first and second parents or guardians. The predefined phrases as spoken by the first and second parents or guardians may thus be detected by the microphone. The predefined phrases themselves may be provided by the doll one or more of audibly via at least one speaker and/or visually via the electronic display.

In addition to or in lieu of hardware elements, in some embodiments the instructions may also be executable to control the electronic display to present a first selector associated with a first parent or guardian of the child, where the first selector may be selectable to configure the doll to produce representations of the first parent or guardian as speaking audio. The instructions may also be executable to control the electronic display to present a second selector associated with a second parent or guardian of the child, where the second selector may be selectable to configure the doll to produce representations of the second parent or guardian as speaking audio.

Moreover, in some example implementations the at least one processor may execute the trained DNN locally at the doll. In other example implementations, the doll may receive one or more transmissions from a server, where the one or more transmissions may indicate one or more outputs from an output layer of the DNN, and the doll may audibly produce the representation at least in part based on the one or more transmissions.

In another aspect, a method includes presenting first text of a book on an electronic display, where the electronic display is disposed on a toy, and using a trained artificial neural network (ANN) to audibly produce a representation of at least one person as speaking audio corresponding to the first text.

In still another aspect, an apparatus includes at least one computer readable storage medium that is not a transitory signal. The at least one computer readable storage medium includes instructions executable by at least one processor to use a speech synthesizer executing at least in part at child's toy to audibly produce a representation of the child's parent or guardian as speaking audio corresponding to text of a book.

In another aspect, a doll includes at least one processor, at least one speaker accessible to the at least one processor, and at least one computer memory that is not a transitory signal and that includes instructions executable by the at least one processor to produce a representation of at least one parent or guardian of a child as speaking audio.

The details of the present application, both as to its structure and operation, can best be understood in reference to the accompanying drawings, in which like reference numerals refer to like parts, and in which:

DETAILED DESCRIPTION

Figure 1:
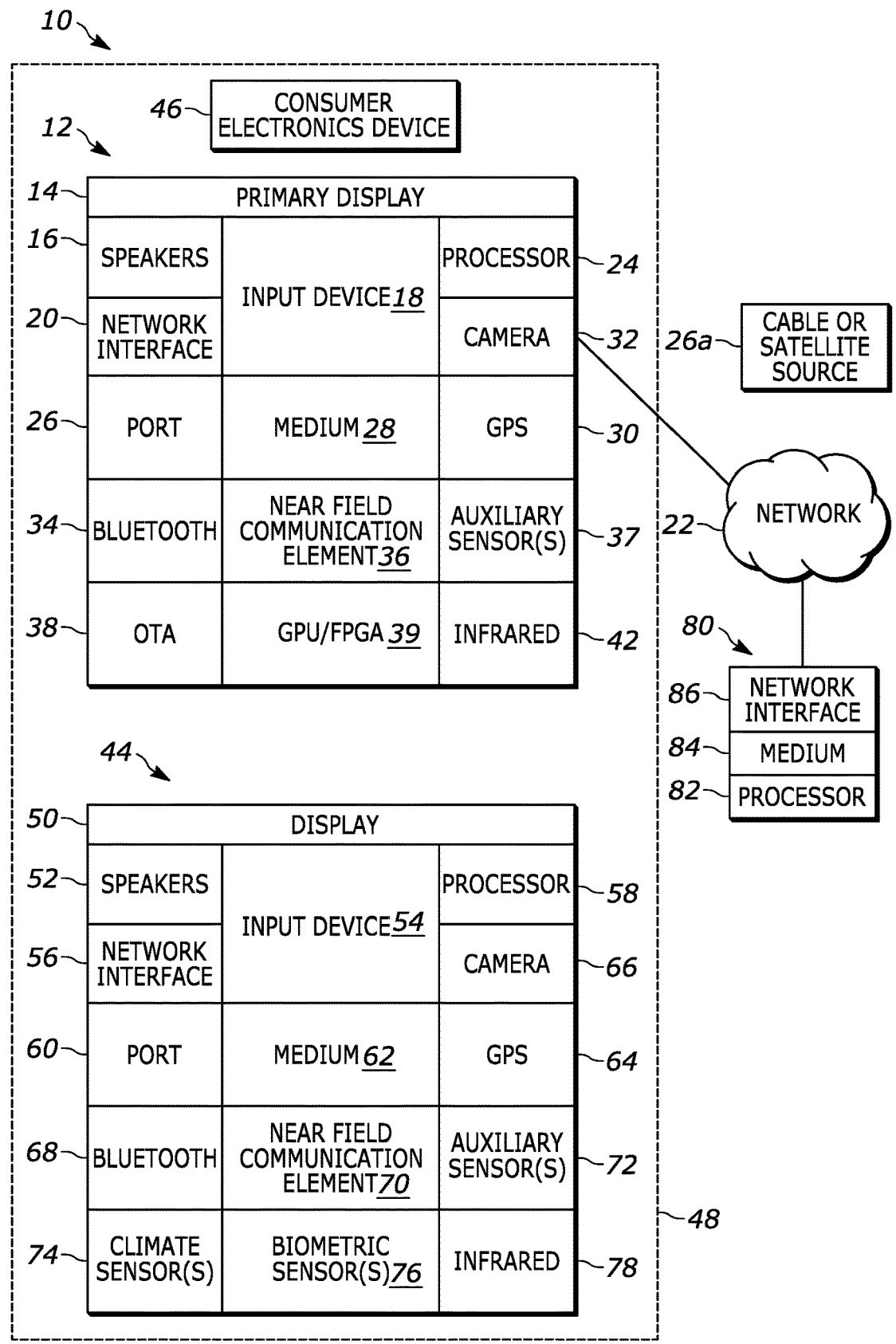
FIG. 1 is a block diagram of an example system in accordance with present principles.

In accordance with present principles, a doll may be configured to use a text-to-speech (TTS) system/software to read bedtime stories to children. The doll's TTS engine may be configured to match the speech characteristics of one or both of the child's parents or legal guardians.

This disclosure relates generally to computer ecosystems including aspects of computer networks that may include consumer electronics (CE) devices. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C # or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is a consumer electronics (CE) device configured as an example primary display device, and in the embodiment shown is an audio video display device (AVDD) 12 such as but not limited to an Internet-enabled TV with a TV tuner (equivalently, set top box controlling a TV). The AVDD 12 may be an Android®-based system. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 and/or other computers described herein is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or higher flat screen and that may or may not be touch-enabled for receiving user input signals via touches on the display. The AVDD 12 may also include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may further include one or more network interfaces 20 for communication over at least one network 22 such as the Internet, an WAN, an LAN, a PAN etc. under control of one or more processors 24. Thus, the interface 20 may be, without limitation, a Wi-Fi transceiver, which is an example of a wireless computer network interface, such as but not limited to a mesh network transceiver. The interface 20 may be, without limitation a Bluetooth transceiver, Zigbee transceiver, IrDA transceiver, Wireless USB transceiver, wired USB, wired LAN, Powerline or MoCA. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a high definition multimedia interface (HDMI) port or a USB port to physically connect (e.g. using a wired connection) to another CE device and/or a headphone port to connect headphones to the AVDD 12 for presentation of audio from the AVDD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player.

The AVDD 12 may further include one or more computer memories 28 such as disk-based or solid-state storage that are not transitory signals, in some cases embodied in the chassis of the AVDD as standalone devices or as a personal video recording device (PVR) or video disk player either internal or external to the chassis of the AVDD for playing back AV programs or as removable memory media. Also, in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor for receiving IR commands from a remote control, an optical sensor, a speed and/or cadence sensor, a gesture sensor (e.g. for sensing gesture command), etc.) providing input to the processor 24. The AVDD 12 may include an over-the-air TV broadcast port 38 for receiving OTA TV broadcasts providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still further, in some embodiments the AVDD 12 may include a graphics processing unit (GPU) and/or a field-programmable gate array (FPGA) 39. The GPU and/or FPGA 39 may be utilized by the AVDD 12 for, e.g., artificial intelligence processing such as training neural networks and performing the operations (e.g., inferences) of neural networks in accordance with present principles. However, note that the processor 24 may also be used for artificial intelligence processing such as where the processor 24 might be a central processing unit (CPU).

Still referring to FIG. 1, in addition to the AVDD 12, the system 10 may include one or more other computer device types that may include some or all of the components shown for the AVDD 12. In one example, a first device 44 and a second device 46 are shown and may include similar components as some or all of the components of the AVDD 12. Fewer or greater devices may be used than shown.

In the example shown, to illustrate present principles all three devices 12, 44, 46 are assumed to be members of a local network in, e.g., a dwelling 48, illustrated by dashed lines.

The example non-limiting first device 44 may include one or more touch-sensitive surfaces 50 such as a touch-enabled video display for receiving user input signals via touches on the display. The first device 44 may include one or more speakers 52 for outputting audio in accordance with present principles, and at least one additional input device 54 such as e.g. an audio receiver/microphone for e.g. entering audible commands to the first device 44 to control the device 44. The example first device 44 may also include one or more network interfaces 56 for communication over the network 22 under control of one or more processors 58. Thus, the interface 56 may be, without limitation, a Wi-Fi transceiver, which is an example of a wireless computer network interface, including mesh network interfaces. It is to be understood that the processor 58 controls the first device 44 to undertake present principles, including the other elements of the first device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first device 44 may also include one or more input ports 60 such as, e.g., a HDMI port or a USB port to physically connect (e.g. using a wired connection) to another computer device and/or a headphone port to connect headphones to the first device 44 for presentation of audio from the first device 44 to a user through the headphones. The first device 44 may further include one or more tangible computer readable storage medium 62 such as disk-based or solid-state storage. Also in some embodiments, the first device 44 can include a position or location receiver such as but not limited to a cellphone and/or GPS receiver and/or altimeter 64 that is configured to e.g. receive geographic position information from at least one satellite and/or cell tower, using triangulation, and provide the information to the device processor 58 and/or determine an altitude at which the first device 44 is disposed in conjunction with the device processor 58. However, it is to be understood that that another suitable position receiver other than a cellphone and/or GPS receiver and/or altimeter may be used in accordance with present principles to e.g. determine the location of the first device 44 in e.g. all three dimensions.

Continuing the description of the first device 44, in some embodiments the first device 44 may include one or more cameras 66 that may be, e.g., a thermal imaging camera, a digital camera such as a webcam, etc. Also included on the first device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first device 44 may include still other sensors such as e.g. one or more climate sensors 74 (e.g. barometers, humidity sensors, wind sensors, light sensors, temperature sensors, etc.) and/or one or more biometric sensors 76 providing input to the device processor 58. In addition to the foregoing, it is noted that in some embodiments the first device 44 may also include an infrared (IR) transmitter and/or IR receiver and/or IR transceiver 42 such as an IR data association (IRDA) device. A battery may be provided for powering the first device 44. The device 44 may communicate with the AVDD 12 through any of the above-described communication modes and related components.

The second device 46 may include some or all of the components described above.

Now in reference to the afore-mentioned at least one server 80, it includes at least one server processor 82, at least one computer memory 84 such as disk-based or solid state storage, and at least one network interface 86 that, under control of the server processor 82, allows for communication with the other devices of FIG. 1 over the network 22, and indeed may facilitate communication between servers, controllers, and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

The devices described below may incorporate some or all of the elements described above.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figure 2:
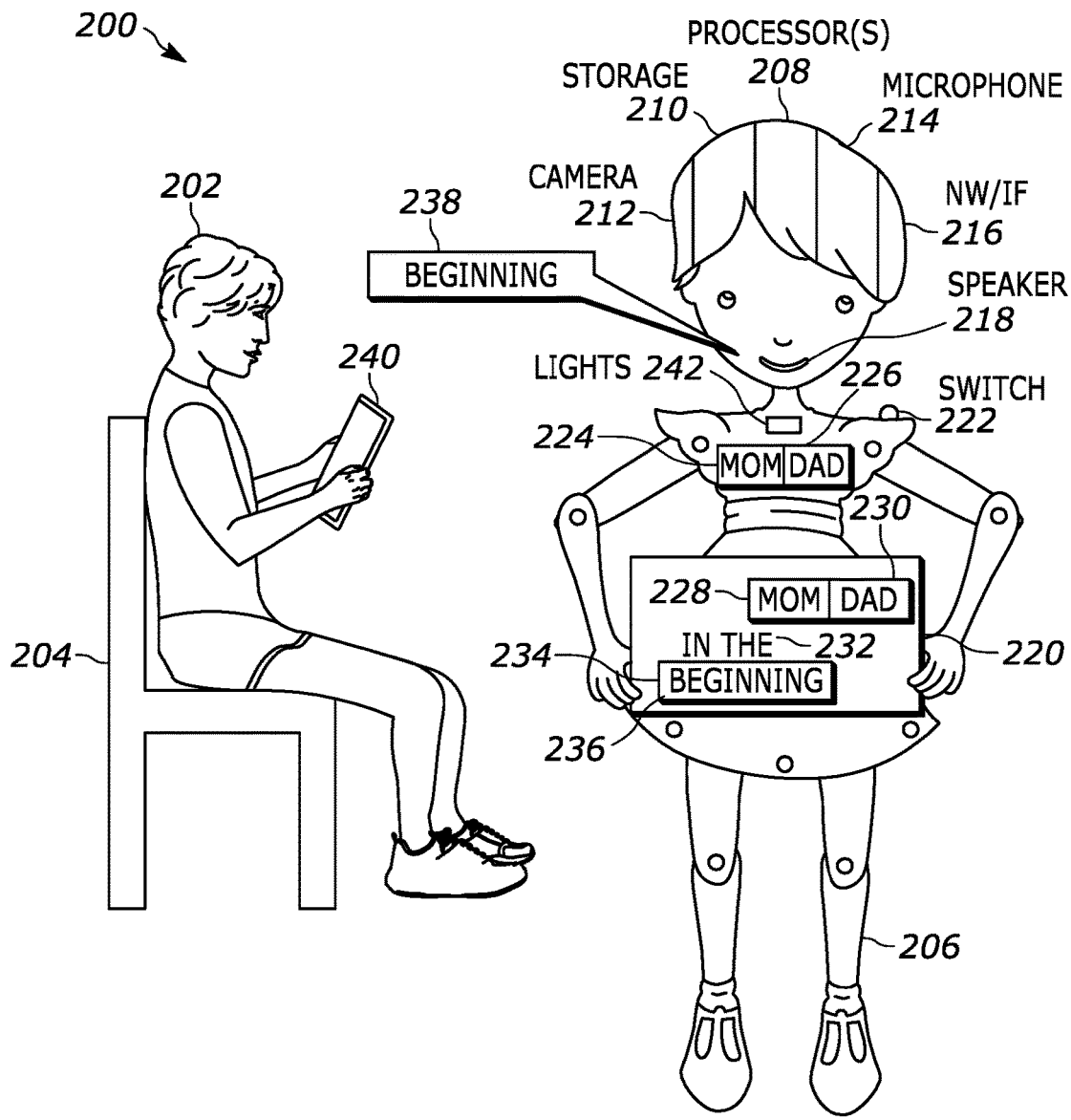
FIG. 2 is an example illustration of a child listening to audible outputs from a doll or toy that duplicates the voice of a parent or guardian consistent with present principles.

FIG. 2 shows an example illustration 200 in accordance with present principles. As shown, a child 202 is sitting in a chair 204 observing a doll or other toy 206. The doll 206 may include one or more processors 208, computer memory 210, a camera 212, a microphone 214, a network interface 216, a speaker 218, and an electronic display 220, all of which may be used to undertake present principles as set forth herein.

The doll 206 may also include a switch 222 that is transitionable between two (or more) configurations, one for each respective parent or legal guardian of the child 202 for which a respective speech synthesizer has been trained for voice imitation/representation. Additionally, or alternatively, the doll 206 may include respective, separate hardware elements 224, 226 that may be depressible buttons and may be respectively selectable to select one respective parent or legal guardian of the child 202 for which a respective speech synthesizer has been trained for voice imitation/representation. Still further, in some embodiments the electronic display 220 may be touch-enabled so that it may present respective "soft button" selectors 228, 230 that may be presented as graphical elements on the display 220 and be respectively selectable based on touch input to select one respective parent or legal guardian of the child 202 for which a respective speech synthesizer has been trained for voice imitation/representation.

Thus, using the hardware elements 222, 224, 226, and/or using the selectors 228, 230, a person such as the child 202 may configure the doll 206 to produce audible representations of the voice of the associated parent or guardian as reading text 232 of a children's book presented on the electronic display 220. Additionally, as each word presented on the display 220 is audibly "spoken" in the voice of the parent or guardian using one of the speech synthesizers/DNNs disclosed herein, that respective word as presented on the display 220 may be concurrently highlighted so that as different words are spoken as the doll 206 progressively "reads" the text aloud, the respective word that is being spoken is simultaneously highlighted as presented on the display 220 while no other words presented on the display 220 are highlighted until they are respectively spoken at a different time. The above configuration may be done using voice input to the microphone and output on the speaker of the doll.

As also shown in FIG. 2, the highlighting itself may be in the form of a circle 234 surrounding the word that is currently being spoken by the doll 206 in the voice of the parent/guardian. The highlighting may also be in the form of an underline 236 of the word that is currently being spoken by the doll 206. Additionally, or alternatively, the highlighting may be in the form of presenting the word itself on the display 220 as it is spoken by the doll, with no other words being concurrently presented on the display 220 until they are respectively spoken themselves at different times. Highlighting may also include presenting the highlighted word in a particular text color (e.g., green) different from the color(s) in which surrounding portions of text might be presented (e.g., black, white, or red). In any case, note that speech bubble 238 indicates the respective word being "spoken" by the doll 206 via the speaker 218 in the voice of the parent/guardian in a given moment in the sequence of the doll 206 progressively reading aloud the text of the children's book.

It is to also be understood that, in some embodiments, the child 202 may hold a physical printed copy 240 of the book that may be a hardback or softback copy of the book with the associated text printed on paper. The doll 206 may be configured so that, in these types of instances, it may actuate its camera 212 to execute object recognition software on images received from the camera to identify the book (e.g., based on a title recognized from the cover). Then, while the child holds the book 240 up with pages of the book 240 that have printed text on them at least partially facing the doll 206, the doll may actuate one or more lights 242 on the doll 206 to direct light toward the respective word that is being audibly represented in the voice of the child's parent/guardian to highlight the respective word as it is "spoken" by the doll 206. Thus, the light(s) 242 may be lasers or light-emitting diodes (LEDs) configured with collimated emission capability or other capability to focus light beams from the LEDs.

Figure 3:
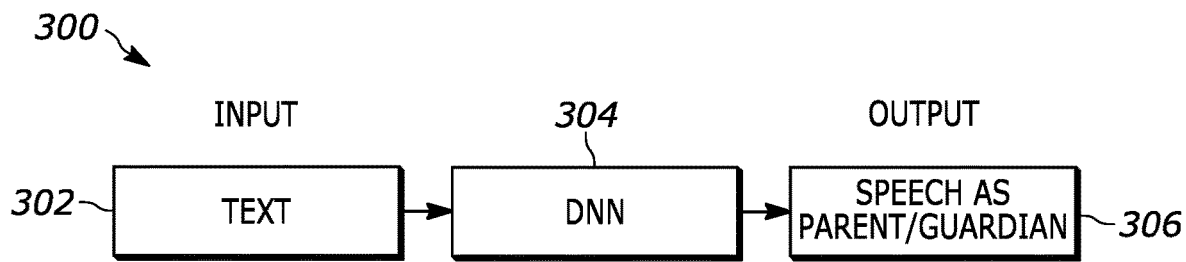
FIG. 3 is an example block diagram of a text-to-speech synthesizer system consistent with present principles.

Now referring to FIG. 3, it is an example simplified block diagram of a text-to-speech synthesizer system 300 according to present principles. The text-to-speech synthesizer system 300 may be incorporated into any of the devices disclosed herein, such as the doll/toy 206, AVDD 12 and/or server 80 for undertaking present principles. As shown, text 302 may be provided as input to an artificial intelligence model 304 that may be established at least in part by an artificial neural network (ANN). For example, the artificial neural network may specifically be a deep neural network (DNN) having multiple hidden layers between input and out layers, and in some embodiments the neural network may even be a deep recurring neural network (DRNN) specifically. As also shown in FIG. 3, the DNN 304 may convert the text 302 into speech 306 as output in the voice of a given parent or legal guardian for which the DNN 304 has been trained.

Further describing the DNN 304, in some examples it may include components such as text analysis, prosody generation, unit selection, and waveform concatenation. Also, in some examples, the DNN may specifically be established at least partially by the Acapela DNN (sometimes referred to as "My-Own-Voice"), a text-to-speech engine produced by Acapela Group of Belgium, or equivalent.

Figure 4:
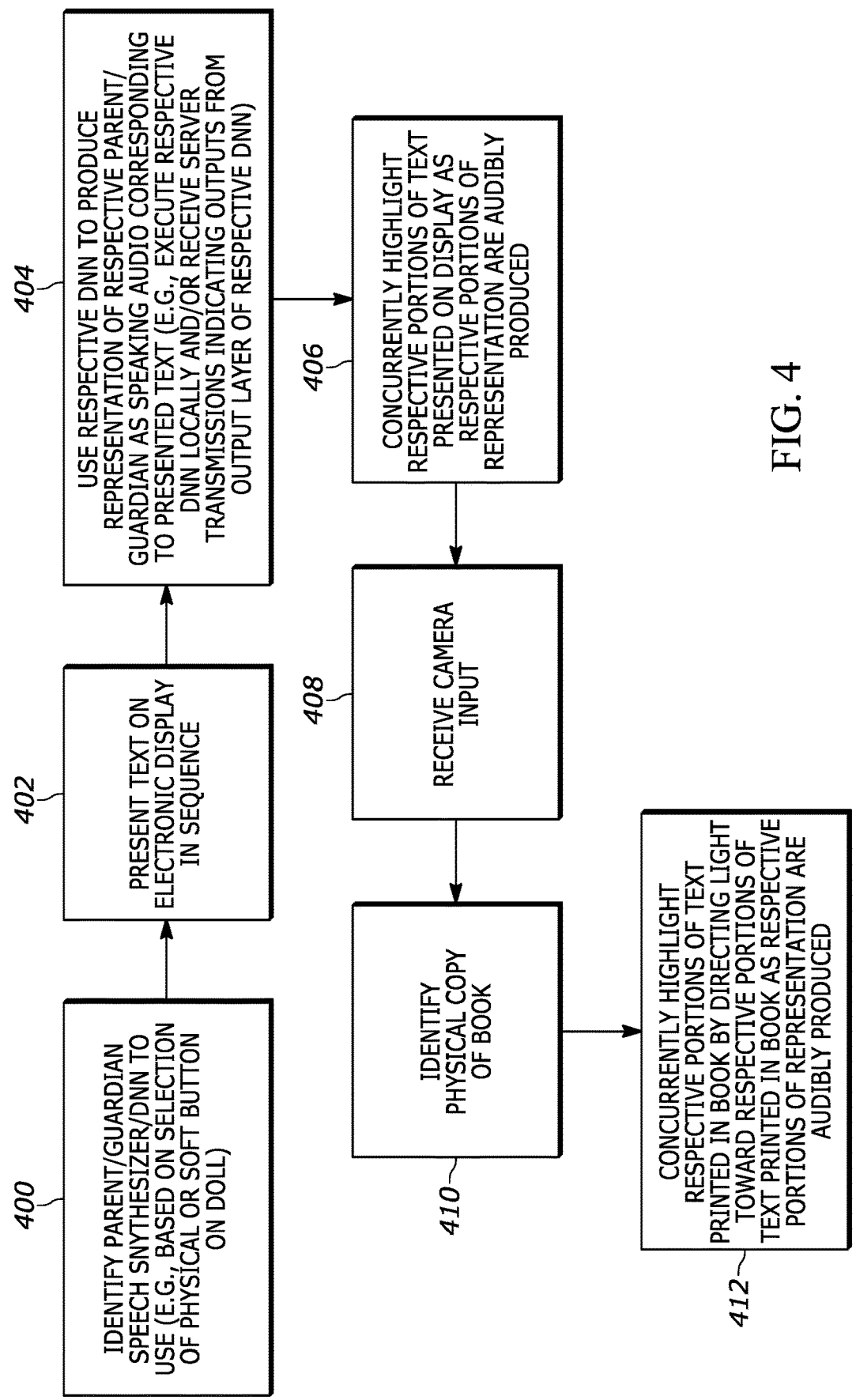
FIG. 4 is a flow chart of example logic for producing an audio representation of a parent or guardian's voice while highlighting corresponding text presented on an electronic display consistent with present principles.

Continuing the detailed description in reference to FIG. 4, a flow chart of example logic is shown for a device to highlight text of a children's book as a doll is used to produce audio in the voice of a child's parent or guardian in accordance with present principles. The device executing the logic of FIG. 4 may be any of the devices disclosed herein, such as the doll, 206, AVDD 12 and/or the server 80.

Beginning at block 400, the device may identify a speech synthesizer associated with a particular parent or guardian which is to be used for producing audio that mimics use of the actual voice of the parent or guardian. The device may do so based on selection of a physical button or soft button as disclosed above, based on configuration of a switch as disclosed above, based on a voice command being received to use a particular speech synthesizer for a particular parent or guardian, based on a default setting being configured to use a particular speech synthesizer for a particular parent or guardian, etc.

From block 400 the logic may then proceed to block 402. At block 402 the device may access and present text of the children's book on an electronic display progressively in sequence, with the text being accessed from, e.g., a digital copy of the book stored at the device or otherwise accessible to it. In some examples, the text of the children's book may be presented on the electronic display of the child's doll or toy itself in accordance with present principles. However, it is to be understood that the text may also be presented on other displays accessible to the device, such as the display of a tablet computer that is in network communication with the device undertaking the logic of FIG. 4.

After block 402 the logic may next proceed to block 404. At block 404 the device may use the respective DNN for the speech synthesizer identified at block 400 to produce, using a speaker, a representation of the associated parent or guardian as speaking audio corresponding to the text. The representation may be produced in a sequence that corresponds to respective portions of the text that are progressively, incrementally presented on the display in the order in which they are juxtaposed in the book itself.

For instance, the display may present one word from the text at a time (with no other words being presented at the same time), and as the word is presented on the display the device may produce an audio representation of the parent or guardian as speaking the word. Or, the display may present a threshold number of words greater than one (e.g., five words at a time), and as the words are presented on the display the device may produce an audio representation of the parent or guardian as audibly reading the words in the sequence they are presented on the display and indeed in the sequence in which they are ordered in the children's book itself.

The device may execute the speech synthesizer/DNN at block 404 locally at the device (e.g., if the device is the doll itself) by providing the text as input to the input layer of the DNN for the DNN to then produce outputs via the output layer of the DNN. Additionally or alternatively, in some embodiments some or all of the speech synthesizer, including the DNN itself, may be executed at a server which may then send transmissions indicating outputs from the output layer of the DNN in the voice of the parent or guardian to the doll/toy that are to be produced at the doll/toy via the doll or toy's speaker.

From block 404 the logic may then move to block 406. At block 406 the device may concurrently highlight respective words presented on the electronic display in sequence as the respective words are audibly produced in sequence to mimic being spoken by the parent or guardian. The words may be highlighted using any of the methods disclosed herein, for instance.

In some embodiments, after block 406 the logic may then proceed to block 408. At block 408 the device may receive input from a camera on or in communication with the device, with the camera imaging a field of view of a location in which the child is disposed. Then at block 410 the device may execute object recognition software using the input from the camera to identify a physical ink and paper copy of the book as being present within the field of view (e.g., based on a title of the book that might be identified from the book's cover or based on a page or certain text of the book being identified using optical character recognition). Further still, in some embodiments the device may not just identify the book but also identify that it is being held by the child before moving on to block 412.

The logic may then move to block 412 where the device may direct light from the doll or toy (e.g., using the lights 242 described above) toward text recognized from the input received at block 408 to concurrently highlight respective words printed in the physical copy in sequence as the respective words are audibly produced in sequence to mimic being spoken by the parent or guardian.

Figure 5:
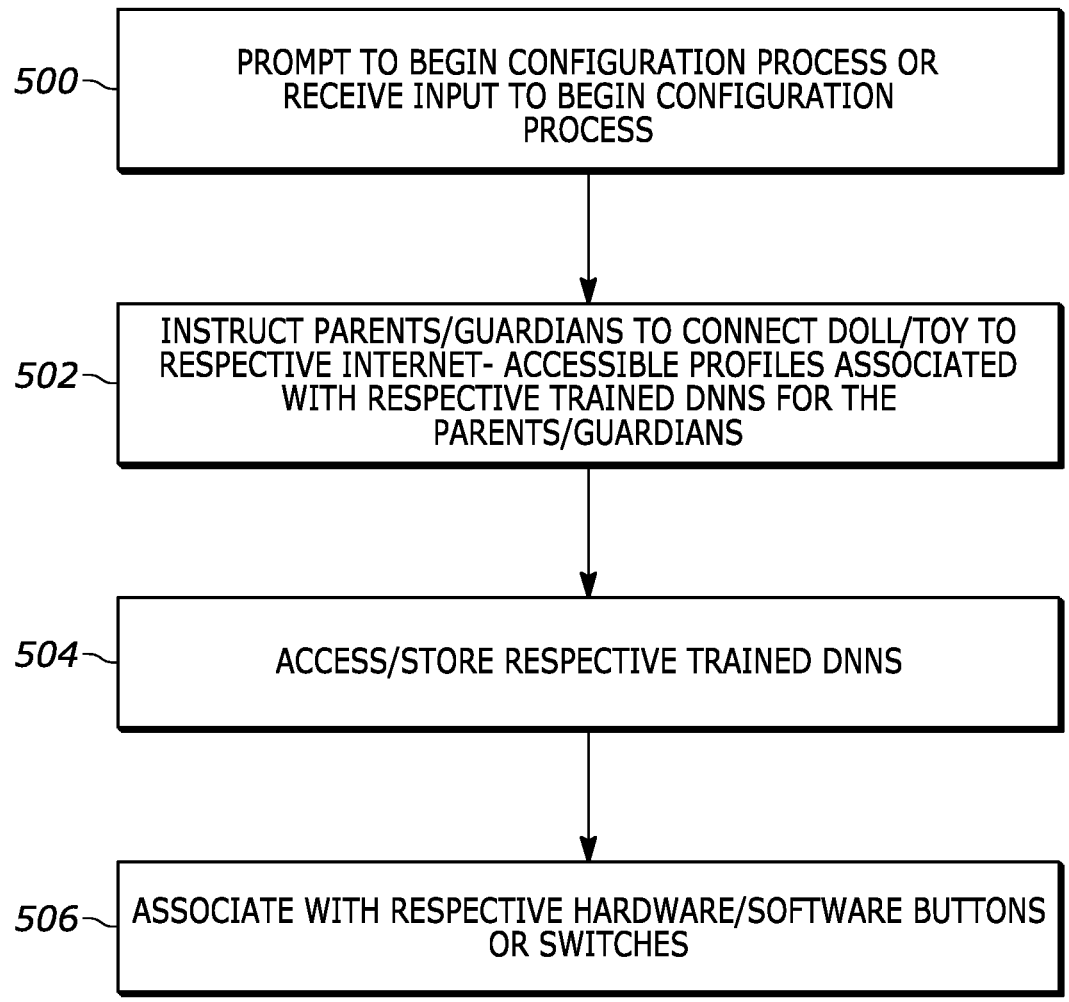
FIGS. 5 and 6 are flow charts of example logic for configuration processes to associate first and second parents or guardians with respective hardware elements or soft buttons consistent with present principles.

Now in reference to FIG. 5, example logic is shown for a device such as the doll/toy 206 to perform a configuration process to associate first and second parents or guardians with respective hardware elements or soft buttons as disclosed herein, such as for association with various configurations of the switch 222 or association with one of the buttons 224, 226, 228, 230. The logic may begin at block 500 where the device may prompt a person to begin the configuration process, e.g., by audible prompt upon power on of the device or a prompt presented on the device's display which may also occur at power on. Additionally, or alternatively, the device may receive user input to begin the configuration process, such as via selection of a selector like the one to be described below in reference to FIG. 7.

From block 500 the logic may move to block 502 where the device may instruct, one at a time, various parents or guardians to connect the device to respective Internet-accessible profiles that might have already been created via a web portal and that are associated with respective trained DNNs for the respective parents or guardians. For instance, a parent or guardian may have already logged in via the web portal to an online system to then speak certain predefined phrases presented through the portal that get detected via a microphone on the device or even another computer. The device may then send the microphone input to the server operating the portal for the server to record/store the microphone input and train unsupervised a respective DNN to produce audio representations of the particular parent or guardian's voice based on the recording, with the portal then associating the trained DNN with the particular user profile used to login to the portal.

Thus, at block 502 the device may provide instruction to connect the device to the Internet and to provide login credentials for the user's profile so that the device may subsequently access the respective trained DNN for the associated parent or guardian via the portal at block 504. Also, at block 504, the device may even store a copy of the trained DNN locally at the device for execution. Then at block 506 the device may prompt (e.g., audibly) the respective parent or guardian to specify a particular button/selector on the doll/toy that the parent wishes to be associated with their respective trained DNN and hence their voice. In some examples, the user may specify as much via selection of the button/selector itself. Additionally, or alternatively, at block 506 the device may prompt the respective parent or guardian to configure the switch 222 in a position that the parent or guardian desires to be associated with their respective trained DNN and hence their voice. In any case, based on the prompt and then the corresponding user input being received, at block 506 the device may then associate the specified hardware or software element with the respective DNN and/or profile.

Figure 6:
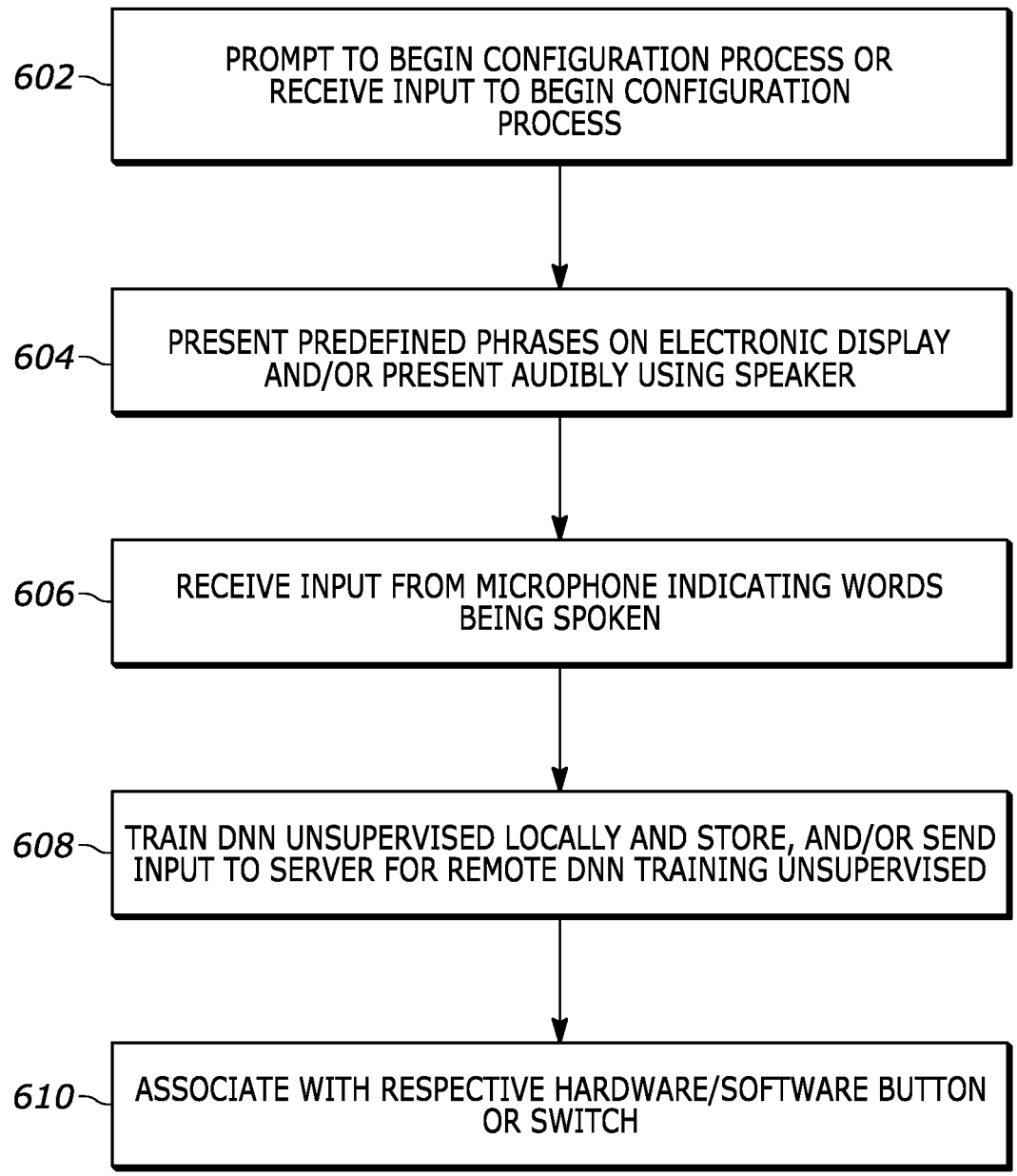

Turning to FIG. 6, it also shows example logic for a device such as the doll/toy 206 to perform a configuration process to associate first and second parents or guardians with respective hardware elements or soft buttons as disclosed herein, such as for association with various configurations of the switch 222 or association with one of the buttons 224, 226, 228, 230. The logic may begin at block 600 where the device may prompt a person to begin the configuration process, e.g., by audible prompt upon power on of the device or a prompt presented on the device's display which may also occur at power on. Additionally, or alternatively, the device may receive user input to begin the configuration process, such as via selection of a selector like the one to be described below in reference to FIG. 7.

From block 600 the logic may move to block 602 where the device may instruct a single parent or guardian to speak certain predefined phrases that are to be presented on the device's display so that the device's microphone may detect the parent or guardian speaking the phrases. Also, at block 602, the device may then begin presenting the predefined phrases, one at a time until the parent or guardian is identified as speaking the phrase, at which point another phrase may be presented. Additionally, or alternatively, the device may begin presenting the predefined phrases one at a time as set forth above but may present them audibly via a speaker rather than on the display so that the parent or guardian may repeat the phrase audibly after hearing it. Thus, block 606 represents the device actually receiving input from the microphone indicating the respective phrases as being spoken.

After block 606 the logic may then proceed to block 608 where the device may train a DNN unsupervised locally at the device and store the DNN locally at the device. Additionally, or alternatively, the device may transmit the microphone input to a server, where the server may train the DNN unsupervised and then one or both of maintain/store the DNN at the server and/or transmit the trained DNN back to the device for storage locally at the device. But whether trained locally and/or remotely at a server, the logic may then move to block 610 where the device may prompt (e.g., audibly) the respective parent or guardian to specify a particular button/selector on the doll/toy that the parent wishes to be associated with their respective trained DNN and hence their voice. In some examples, the user may specify as much via selection of the button/selector itself. Additionally, or alternatively, at block 610 the device may prompt the respective parent or guardian to configure the switch 222 in a position that the parent or guardian desires to be associated with their respective trained DNN and hence their voice. In any case, based on the prompt and then the corresponding user input being received, at block 610 the device may then associate the specified hardware or software element with the respective DNN and/or profile.

Now describing training of a respective DNN to a respective parent or guardian's voice as might be done via the logic of either of FIGS. 5 and 6, it is to be understood that the device may initially establish a DNN by accessing a base copy of the Acapela "My-Own-Voice" DNN produced by Acapela Group of Belgium. Additionally, or alternatively, the device may copy a domain from another text-to-speech engine. The device may then access recorded speech of the parent or guardian as might have been stored based on microphone input as described above. The device may also access text corresponding to the recorded speech, for example text of the predefined phrases themselves that were presented to the parent or guardian for the parent/guardian to speak them in the first place. The phrases themselves may have been initially provided to the device by a system administrator, for example.

The device may then analyze the respective portions of recorded speech corresponding to the respective predefined phrases, as well as the corresponding text of the predefined phrases themselves (which may constitute labeling data corresponding to the respective portions of recorded speech in some examples), to train the text-to-speech DNN to the parent/guardian's voice. The device may train the DNN supervised, partially supervised and partially unsupervised, or simply unsupervised, and may do so at least in part using methods similar to those employed by Acapela Group of Belgium for training its Acapela text-to-speech DNN ("My-Own-Voice") to a given user's voice based on speech recordings of the user (e.g., using Acapela's first-pass algorithm to determine voice ID parameters to define the parent/guardian's digital signature or sonority, and using Acapela's second-pass algorithm to further train the DNN to match the imprint of the parent/guardian's voice with fine grain details such as accents, speaking habits, etc.)

Figure 7:
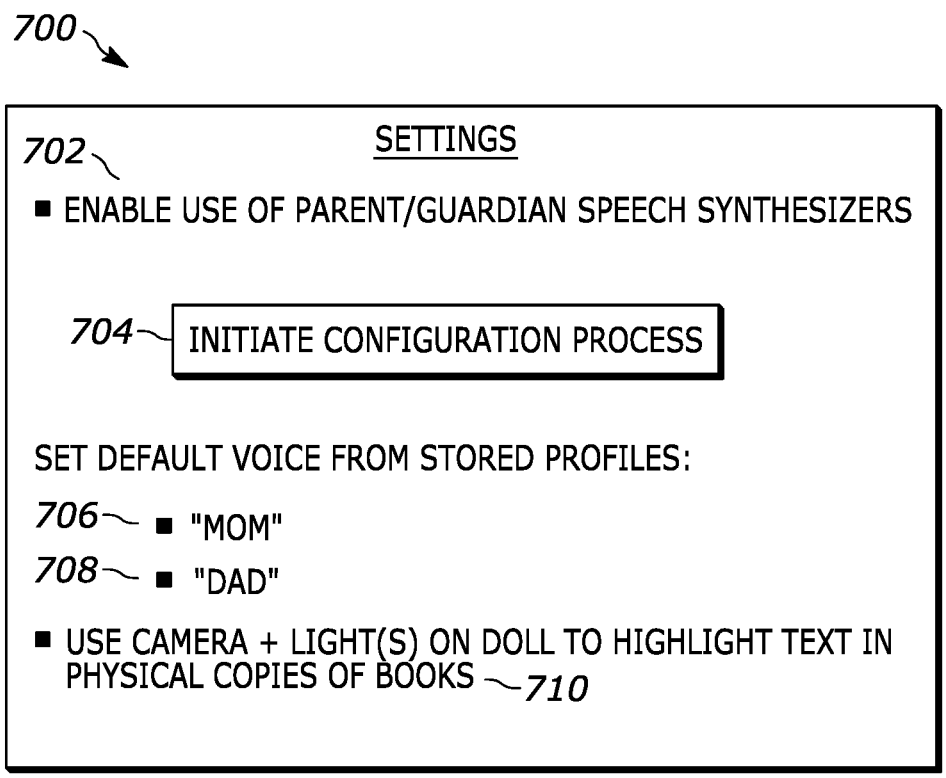
FIG. 7 is an example graphical user interface (GUI) for a user to configure settings of a device operating according to present principles.

Referring now to FIG. 7, a graphical user interface (GUI) 700 is shown that is presentable on an electronic display that is accessible to a device undertaking present principles. The GUI 700 may be manipulated to configure one or more settings of the device for undertaking present principles. It is to be understood that each of the settings options to be discussed below may be selected by directing touch or cursor input to a portion of the display presenting the respective check box for the adjacent option.

As shown, the GUI 700 may include a first option 702 that is selectable to enable the device to undertake present principles for mimicking the voice of a parent/guardian. For example, the option 702 may be selectable to enable the device to undertake the logic of FIGS. 4-6.

The GUI 700 may also include a selector 704 that is selectable to initiate a configuration process in accordance with present principles. For example, the selector 704 may be selected to initiate the processes set forth above with respect to FIGS. 5 and 6.

The GUI 700 may also include options 706, 708 to respectively select one parent/guardian or another to set as a default voice in which to present audible representations of text of a book that is also presented on an electronic display in accordance with present principles. Thus, for example, upon power on of the device or upon selection of a given book for which text and corresponding audible representations are to be presented, the device may select the default voice without further user input such as input that might be directed to any of the elements 222-230 described above in reference to FIG. 2.

Additionally, the GUI 700 may include an option 710 that is selectable to configure the device to use a camera and one or more lights disposed on the device/doll to highlight text printed in a physical copy of a book that is also being audibly reproduced in the voice of a given parent/guardian. Thus, for example, option 710 may be selected to configure the device to undertake the steps of blocks 408-412 described above in reference to FIG. 4.

It will be appreciated that whilst present principals have been described with reference to some example embodiments, these are not intended to be limiting, and that various alternative arrangements may be used to implement the subject matter claimed herein.

What is claimed is:

1. A doll, comprising:
at least one processor;
at least one element on the doll and manipulable by hand to assume a first configuration to configure the doll to produce representations of a first person as speaking audio, the at least one element being manipulable to produce representations of a second person as speaking audio; and
at least one speaker accessible to the at least one processor;
the processor being programmed with instructions to:
produce a representation of the first person as speaking audio responsive to the at least one element being in the first configuration and produce a representation of the second person as speaking audio responsive to the at least one element being in the second configuration, a microphone being accessible to the at least one processor, and wherein the instructions are executable to instruct the first and second persons to speak phrases provided by the doll to train respective deep neural networks (DNNs) for the respective first and second persons, the phrases as spoken by the first and second persons being detected by the microphone.

2. The doll of claim 1, comprising:
an electronic display accessible to the at least one processor, wherein the instructions are executable to:
present first text of a children's book on the electronic display; and
concurrently highlight respective portions of the first text as presented on the electronic display as corresponding respective portions of the representation are audibly produced.

3. The doll of claim 2, wherein the instructions are executable to:
highlight the respective portions of the first text as presented on the electronic display by underlining or circling the respective portions of the first text as the corresponding respective portions of the representation are audibly produced; and/or
highlight the respective portions of the first text as presented on the electronic display by presenting the respective portions of the first text as the corresponding respective portions of the representation are audibly produced; and/or
highlight the respective portions of the first text as presented on the electronic display by highlighting the respective portions of the first text in a particular color as the corresponding respective portions of the representation are audibly produced.

4. The doll of claim 2, wherein the instructions are executable to:
control the electronic display to present a first selector associated with the first person associated with the child, the first selector being selectable to configure the doll to produce representations of the first person as speaking audio; and
control the electronic display to present a second selector associated with the second person of the child, the second selector being selectable to configure the doll to produce representations of the second person as speaking audio.

5. The doll of claim 2, wherein the instructions are executable to:
highlight the respective portions of the first text as presented on the electronic display by underlining or circling the respective portions of the first text as the corresponding respective portions of the representation are audibly produced.

6. The doll of claim 1, comprising a network interface accessible to the at least one processor, and wherein the instructions are executable to instruct to connect, via the network interface, the doll to one or more Internet-accessible voice profiles, the one or more Internet-accessible voice profiles being associated with respective deep neural networks (DNNs) for the respective first and second persons.

7. The doll of claim 6, wherein the DNNs are trained unsupervised.

8. The doll of claim 6, wherein the at least one processor is adapted to execute at least one of the trained DNNs locally at the doll.

9. The doll of claim 6, wherein the instructions are executable to:
receive one or more transmissions from a server, the one or more transmissions indicating one or more outputs from an output layer of at least one of the DNNs, the doll audibly producing the representation at least in part based on the one or more transmissions.

10. The doll of claim 1, wherein the phrases are provided by the doll one or more of: audibly via at least one speaker, visually via an electronic display.

11. A doll comprising:
at least one processor;
a microphone accessible to the at least one processor; and
at least one speaker accessible to the at least one processor;
the processor being programmed with instructions to:
produce a representation of at least a first person as speaking audio, the doll further comprising:
a first hardware element with which the first person is associable such that upon association the first hardware element is manipulable to configure the doll to produce representations of the first person as speaking audio; and
a second hardware element with which a second person is associable such that upon association the second hardware element is manipulable to configure the doll to produce representations of the second person as speaking audio, the second person being different from the first person, and wherein the instructions are executable to prompt to speak phrases provided by the doll to train respective deep neural networks (DNNs) for the respective first and second persons, the phrases as spoken by the first and second persons being detected by the microphone.

12. The doll of claim 11, wherein the instructions are executable to associate the first and second hardware elements with the first and second persons, respectively.

13. The doll of claim 11, wherein the first and second hardware elements are embodied in a single hardware element that includes a switch disposed on the doll and accessible to the at least one processor.

14. The doll of claim 11, wherein the first and second hardware elements are embodied in different respective hardware elements.

15. An apparatus, comprising:
at least one computer readable storage medium that is not a transitory signal, the at least one computer readable storage medium comprising instructions executable by at least one processor to:
present at least one perceptible prompt for first and second persons to speak phrases provided by a doll to train respective deep neural networks (DNNs) for the respective first and second persons, the phrases as spoken by the first and second persons being detected by a microphone;
produce a representation of the first person as speaking audio according to training of at least one of the DNNs responsive to establishing a first configuration of the doll; and
produce a representation of a second person as speaking audio according to training of at least one of the DNNs responsive to establishing a second configuration of the doll.

* * * * *